(12) United States Patent
Houck et al.

(10) Patent No.: US 8,775,459 B2
(45) Date of Patent: Jul. 8, 2014

(54) METHOD AND APPARATUS FOR ROBUST INPUT INTERPRETATION BY CONVERSATION SYSTEMS

(75) Inventors: Keith C. Houck, Rye, NY (US); Shimei Pan, Armonk, NY (US); Siwei Shen, Ann Arbor, MI (US); Michelle X. Zhou, Briarcliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 959 days.

(21) Appl. No.: 11/031,038

(22) Filed: Jan. 7, 2005

(65) Prior Publication Data
US 2006/0155673 A1 Jul. 13, 2006

(51) Int. Cl.
G06F 17/30 (2006.01)
(52) U.S. Cl.
CPC .............................. *G06F 17/30401* (2013.01)
USPC ........................................................ 707/768
(58) Field of Classification Search
USPC ........................................................ 707/768
See application file for complete search history.

(56) References Cited

U.S. PATENT DOCUMENTS

| | | | | |
|---|---|---|---|---|
| 5,454,106 A * | 9/1995 | Burns et al. | ........................ | 707/4 |
| 6,006,225 A * | 12/1999 | Bowman et al. | .................... | 707/5 |
| 6,144,958 A * | 11/2000 | Ortega et al. | ...................... | 707/5 |
| 6,523,028 B1 * | 2/2003 | DiDomizio et al. | ........... | 707/748 |
| 6,647,383 B1 * | 11/2003 | August et al. | ....................... | 707/3 |
| 6,772,150 B1 * | 8/2004 | Whitman et al. | ................... | 707/6 |
| 6,829,603 B1 * | 12/2004 | Chai et al. | ........................... | 707/5 |
| 6,895,406 B2 * | 5/2005 | Fables et al. | .................... | 707/765 |
| 7,343,371 B2 * | 3/2008 | Ibuki et al. | ......................... | 707/4 |
| 2002/0059069 A1 * | 5/2002 | Hsu et al. | ........................ | 704/257 |
| 2003/0041058 A1 * | 2/2003 | Ibuki et al. | ........................ | 707/4 |
| 2004/0172258 A1 * | 9/2004 | Dominach et al. | ............. | 704/277 |
| 2005/0038781 A1 * | 2/2005 | Ferrari et al. | ...................... | 707/4 |

* cited by examiner

*Primary Examiner* — Robert Beausoliel Jr.
*Assistant Examiner* — Nirav K Khakhar
(74) *Attorney, Agent, or Firm* — William Stock (57) ABSTRACT

One embodiment of the present method and apparatus for robust input interpretation by conversation systems includes receiving a user request containing at least one un-interpretable term. The present invention conveys the conversation system's interpretation capabilities to the user, for example by suggesting at least one alternative request in context of the un-interpretable user request, where the alternative request is phrased in a manner that is substantially fully interpretable. A user may then select a suggested alternative request or formulate a new request in accordance with knowledge of the conversation system capabilities learned from the conveyed information. In another embodiment, a method may independently (e.g., without user prompting) adapt the un-interpretable user request in accordance with learned information regarding the meaning of any un-interpretable terms in the user request.

15 Claims, 8 Drawing Sheets

| FEATURE | DEFINITION |
|---|---|
| NATURAL LANGUAGE INPUT | |
| WORD | CHARACTERS BELONGING TO A WORD OR PHRASE |
| POSITION | STARTING POSITION OF THE WORD/PHRASE |
| LENGTH | LENGTH OF THE WORD/PHRASE |
| POS | PART OF SPEECH TAG |
| SYNONYM | SYNONYMS OF THE WORD FROM WORDNET |
| ATTACHED TO | POSSIBLE SYNTACTIC ATTACHMENTS (TO OTHER WORDS/PHRASES) |
| GESTURE INPUT | |
| COORDINATES | RESULTING SPATIAL COORDINATES |
| TRAJECTORY | RESULTING TRAJECTORY OF THE COORDINATES |
| OBJECTS | ON-SCREEN OBJECTS INTERSECTING WITH THE COORDINATES |
| ORDER | WHEN THIS GESTURE OCCURS AMONG A SERIES GESTURES |
| DURATION | THE DURATION OF THIS GESTURE LASTS |

METHOD AND APPARATUS FOR ROBUST INPUT INTERPRETATION BY CONVERSATION SYSTEMS

BACKGROUND

The present invention relates generally to conversation systems and relates more particularly to the interpretation of input by conversation systems.

Conversation systems allow a user to interact with or search a database of information by receiving and responding to user data requests. For example, a user may search real estate listings by presenting a conversation system with a query that is defined by one or more search criteria, such as "Show all houses in Scarsdale, N.Y. priced at $400,000 or less". The conversation system then dissects this query and searches the database for results that meet the user's search criteria.

One common shortcoming of conventional conversation systems is limited interpretation capability. Due to limited vocabularies and grammars, typical conversation systems can experience difficulties in correctly interpreting even search criteria with unambiguous meanings, such as the city name "Scarsdale, N.Y." or the price "$400,000 or less" in the example above. These difficulties are magnified when qualitative search criteria is provided by the user. For example, a typical conversation system would not be capable of interpreting the command "Show all houses in good school districts priced at $400,000 or less", because the search criteria "good school districts" is not clearly defined (that is, the conversation system can not know what the user means by "good").

Some conversation systems attempt to address this difficulty by simply recognizing or understanding a wider range of potential input expressions. However, algorithms for adapting these expanded vocabularies are still imperfect or unknown. Moreover, such an approach increases the cost and the computational complexity of the conversation system. The feasibility of this solution is therefore still limited.

Thus, there is a need in the art for a method and apparatus for robust input interpretation by conversation systems.

SUMMARY OF THE INVENTION

One embodiment of the present method and apparatus for robust input interpretation by conversation systems includes receiving a user request containing at least one un-interpretable term, where a "term" is understood to be at least one component of a user request, such as a word, a phrase, a gesture, a graphical user interface input or a relationship between two or more words, phrases, gestures or graphical user interface inputs. The present invention conveys the conversation system's interpretation capabilities to the user, for example by suggesting at least one alternative request in context of the un-interpretable user request, where the alternative request is phrased in a manner that is substantially fully interpretable. A user may then select a suggested alternative request or formulate a new request in accordance with knowledge of the conversation system capabilities learned from the conveyed information. In another embodiment, a method may independently (e.g., without user prompting) adapt the un-interpretable user request in accordance with learned information regarding the meaning of any un-interpretable terms in the user request.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for robust input interpretation by conversation systems. Embodiments of the present invention may be implemented by both uni-modal (e.g., used to interpret one modality, such as natural language or gesture) and multi-modal (e.g., used to interpret multiple modalities) conversation systems to improve interpretation capability. In one embodiment, the present invention provides a two-way adaptation framework that both enables a user to adapt to the conversation system capabilities in context and enables the conversation system to dynamically learn new user expressions.

Figure 1:
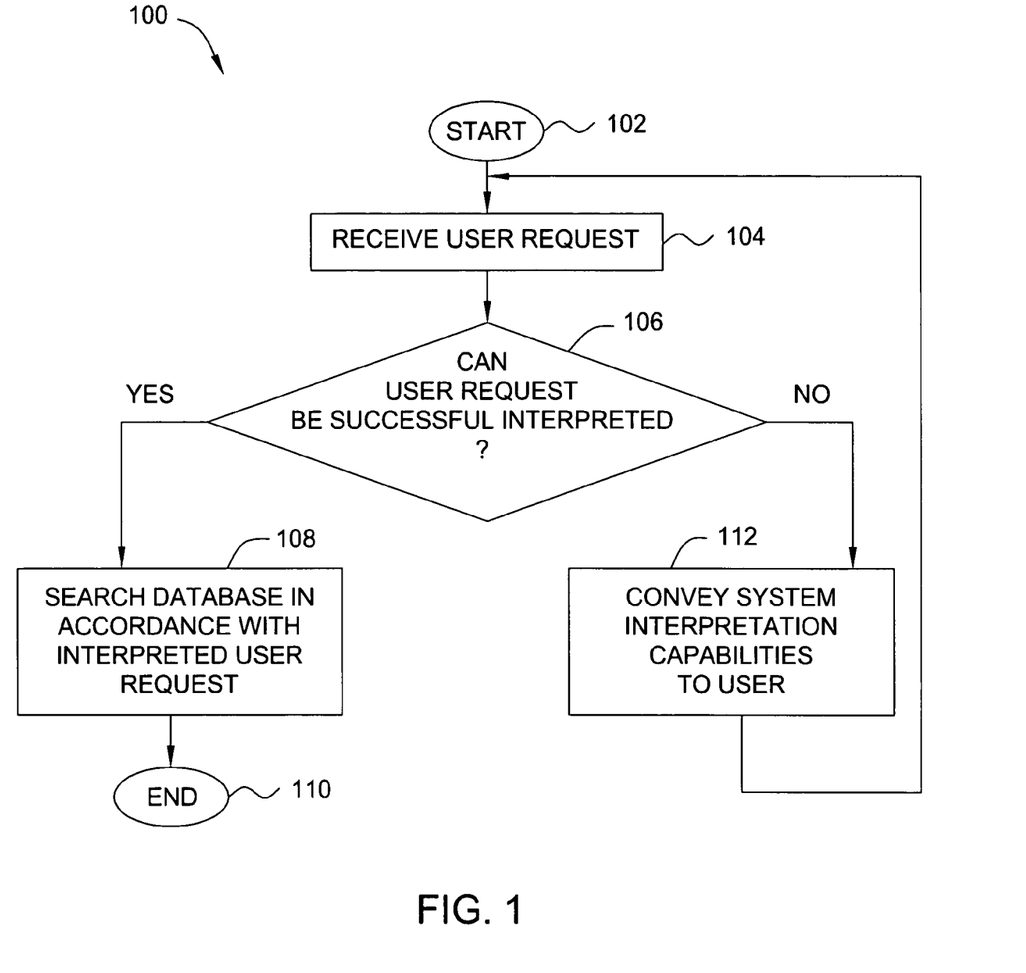
FIG. 1 is a flow diagram illustrating one embodiment of a method for robust input interpretation according to the present invention.

FIG. 1 is a flow diagram illustrating one embodiment of a method 100 for robust input interpretation according to the present invention. The method 100 may be executed at, for example, a conversation system, in order to help the conversation system convey its capabilities to a user. The method 100 is initialized at step 102 and proceeds to step 104, where the method 100 receives a user request (e.g., in the form of a spoken, text, gesture or graphical user interface request). For example, the user request may be the spoken request, "Show all Tudors in good school districts".

In step 106, the method 100 determines whether the user request received in step 104 can be successfully interpreted by the conversation system, e.g., whether all terms, including search criteria, and all relationships between terms in the user request are understood by the conversation system. As used herein in the context of a user request, "term" refers to any component of a user request, including a spoken or typed word or phrase, a gesture and a graphical user interface input.

In one embodiment, the ability of the conversation system to successfully interpret the user request is impacted by the manner in which the user request is phrased (e.g., "Find x" versus "Show x"), by the presence of ambiguous, subjective or evaluative words and phrases in the user request (e.g., "good" or "bad"), and/or by the absence of available information pertaining to a given term (e.g., no information available that meets the search criteria). If the method 100 determines in step 106 that the user request can be successfully interpreted by the conversation system, the method 100 proceeds to step 108 and searches the appropriate database in accordance with the interpreted user request, e.g., to produce results responsive to the user request. Thus, step 108 may be executed in accordance with any searching technique, including known searching techniques used by conventional conversation systems. The method 100 then terminates in step 110.

Alternatively, if the method 100 determines in step 106 that the user request cannot be successfully interpreted by the conversation system, the method 100 proceeds to step 112 and conveys the conversation system's interpretation capabilities to the user. In one embodiment, conveyance of the conversation system's capabilities in accordance with step 112 includes providing feedback associated with at least one un-interpretable term in the user request to the user, where the feedback is structured to enable the user to adapt the user request in a manner that is substantially fully interpretable by the conversation system. In one embodiment, the feedback is at least one of: at least one valid alternative request in context, at least one help topic (e.g., similar to a Frequently Asked Question) or a statement informing the user that the requested information is not available (e.g., "I don't have any information on Tudors"). Within the context of the present invention, a "valid" request is a request that the conversation system can successfully interpret. Thus, in this embodiment, the method 100 presents the user with alternate phrasings that potentially reflect the original, un-interpretable user request but, unlike the original user request, are substantially fully understandable by the conversation system. In one embodiment, at least one valid request is stored in a query template corpus or database that is accessible by the method 100.

Thus, for example, based on the exemplary user request described above, the method 100 may suggest alternative requests such as "Show all Tudors in school districts having average class sizes of twenty students or less" or "Show all Tudors in school districts having at least an eighty-five percent graduation rate", where the search criteria relating to average class size and graduation rate seek to clarify or redefine the qualitative criterion "good school districts" as a criterion that the method 100 can interpret and search. The user may therefore select from among the suggested alternative requests one which most closely reflects the intent of the original user request. Alternatively, the user may revise an alternative request and submit it as a new request (e.g., "Show all Tudors in school districts having at least a ninety percent graduation rate"), or the user may select none of the suggested alternative requests and simply attempt to rephrase the original user request as a new user request.

Thus, after conveying the conversation system's interpretation capabilities to the user, the method 100 returns to step 104 and proceeds as discussed above, e.g., using a selected alternative request, a new user request or revised version of the original user request.

The method 100 thereby facilitates the interaction of a human user and a conversation system by making the conversation system's abilities apparent to the user. That is, if the user relays a request to the conversation system, and the conversation system is unable to interpret the request as it is phrased, the conversation system, by suggesting alternative requests, can "teach" the user to make requests in a manner that is understandable by the conversation system. With repeated use, the user may therefore adapt his or her manner of making requests to the known capabilities of the conversation system, enabling the conversation system to produce the desired results more quickly and leading to less frequent system interpretation failure. This method of improving conversation system interaction is therefore less costly and more practically feasible than simply programming the conversation system to understand all possible variations of various input expressions.

Figure 2:
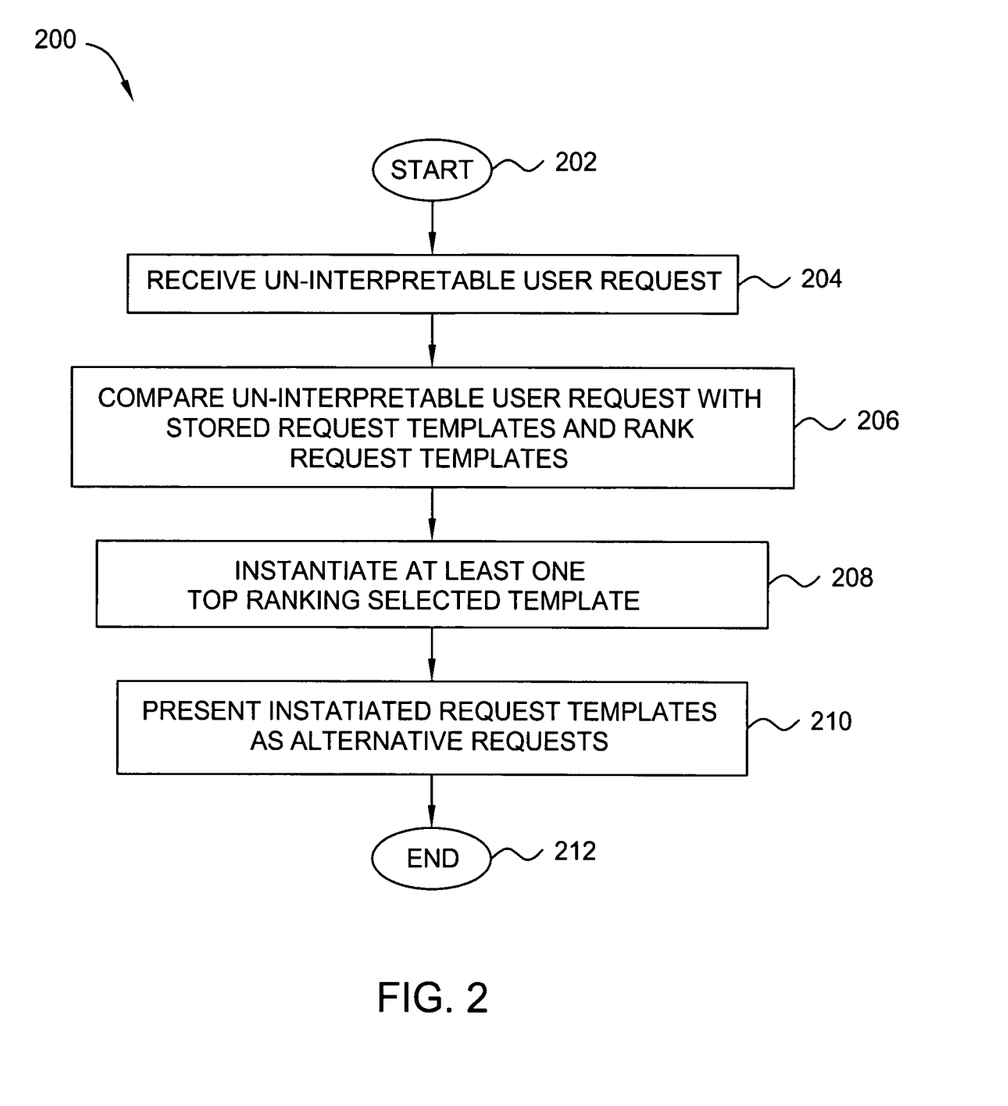
FIG. 2 is a flow diagram illustrating one embodiment of a method for suggesting alternative requests, e.g., in accordance with the method of FIG. 1.

FIG. 2 is a flow diagram illustrating one embodiment of a method 200 for suggesting alternative requests, e.g., in accordance with step 112 of the method 100. The method 200 is initialized at step 202 and proceeds to step 204, where the method 200 receives an un-interpretable user request.

The method 200 then proceeds to step 206 and compares the un-interpretable request with stored request templates. In one embodiment, a stored request template comprises a semantic graph (derived from interpretation results), surface features (from raw input events) and contextual features (from a conversation history). In one embodiment, at least one stored request template is stored in a query template corpus or database that is accessible by the method 200. In one embodiment, the query template corpus is created by extracting all semantic, surface and contextual features from valid user requests. In another embodiment, the query template corpus is created via automatic template generation that systematically populates the query template corpus based on "seed" templates. In another embodiment, the query template corpus is created via automatic sentence generation based on semantic or syntactic grammar used by the method 200.

In one embodiment, the un-interpretable user request is compared to every stored request template in the query template corpus. The method 200 then ranks each stored request template to which the un-interpretable user request has been compared. In one embodiment, ranking of stored request templates is based on at least one of several criteria, including how similar the stored request template is to the un-interpretable user request (e.g., in terms of speech, text, gesture and graphical user interface) and diversity among the top-ranking stored requests templates.

In one embodiment, similarity between an un-interpretable user request and a stored request template is measured by the similarity between the semantic graph of the user request and the semantic graph of the stored request template. In one embodiment, the similarity between the semantic graph of the user request and the semantic graph of the stored request template is measured based on the number of matching nodes in the semantic graph of the user request and the semantic graph of the stored request template. In another embodiment, an exact graph matching algorithm determines the similarity between the semantic graph of the user request and the semantic graph of the stored request template. In another embodiment, similarity between the context of the user request and the context of the stored request template is measured by a linear combination of the similarity between a set of contextual features associated with the user request and a set of contextual features associated with the stored request template. In another embodiment, the similarity between two input text strings (e.g., representing an un-interpretable user request and a stored request template) is computed using the cosine measure between word vectors or using the string edit distance. In another embodiment, the similarity between two gestures, between two graphical user interface events, or between two sets of conversation history features (e.g., representing an un-interpretable user request and a stored request template) is computed using a Euclidian distance. In another embodiment, the similarity between an un-interpretable user request and a stored request template is measured by a linear combination of all of the above similarity measures.

In yet another embodiment, a similarity metric for computing the overall distance D(Q, Q') between a user request, Q, and a stored request template, Q', uses a weighted sum of distances D(G, G') and D(S, S∝) between the respective semantic graphs G and G' and surface features S and S' of the user request Q and the stored request template Q' such that:

$$D(Q,Q')=w_1 \times D(G,G')+w_2 \times D(S,S') \quad \text{(EQN. 1)}$$

where $w_1$ is a weight applied to the distance between the semantic graphs G and G' and $w_2$ is a weight applied to the distance between the surface features S and S'. In one embodiment, exemplary weights for $w_1$ and $w_2$ are determined, empirically, to be 0.65 and 0.35, respectively. In one embodiment, the distances between the semantic graphs and the surface features D(G, G') and D(S, S') are normalized to lie between [0, 1], with a distance of 0.0 representing a perfect match. For the purposes of the above calculation, respective contextual features are built into the semantic graphs G and G'.

In step 208, the method 200 instantiates at least one selected top-ranking request template to generate the surface form for an alternative request. In one embodiment, instantiation in accordance with step 208 is a two-step process that involves: (1) instantiating variables; and (2) realizing context-sensitive expressions, in order to generate an alternative expression similar to the original user request.

In one embodiment, the method 200 instantiates a predefined number of the top-ranked stored request templates, where the predefined number of stored request templates to be instantiated is empirically determined. In one embodiment, step 208 also involves generating a context-appropriate expression based on the current user request and the conversation history.

Once at least one selected request template has been instantiated, the method 200 proceeds to step 210 and presents the at least one instantiated request template to the user, e.g., as a suggested alternative request in accordance with step 112 of the method 100. In one embodiment, instantiated request templates are presented as suggested alternative request in the form of text (e.g., using a display or graphical user interface) or speech (e.g., using a text-to-speech system). The method 200 then terminates in step 212.

Figure 3:
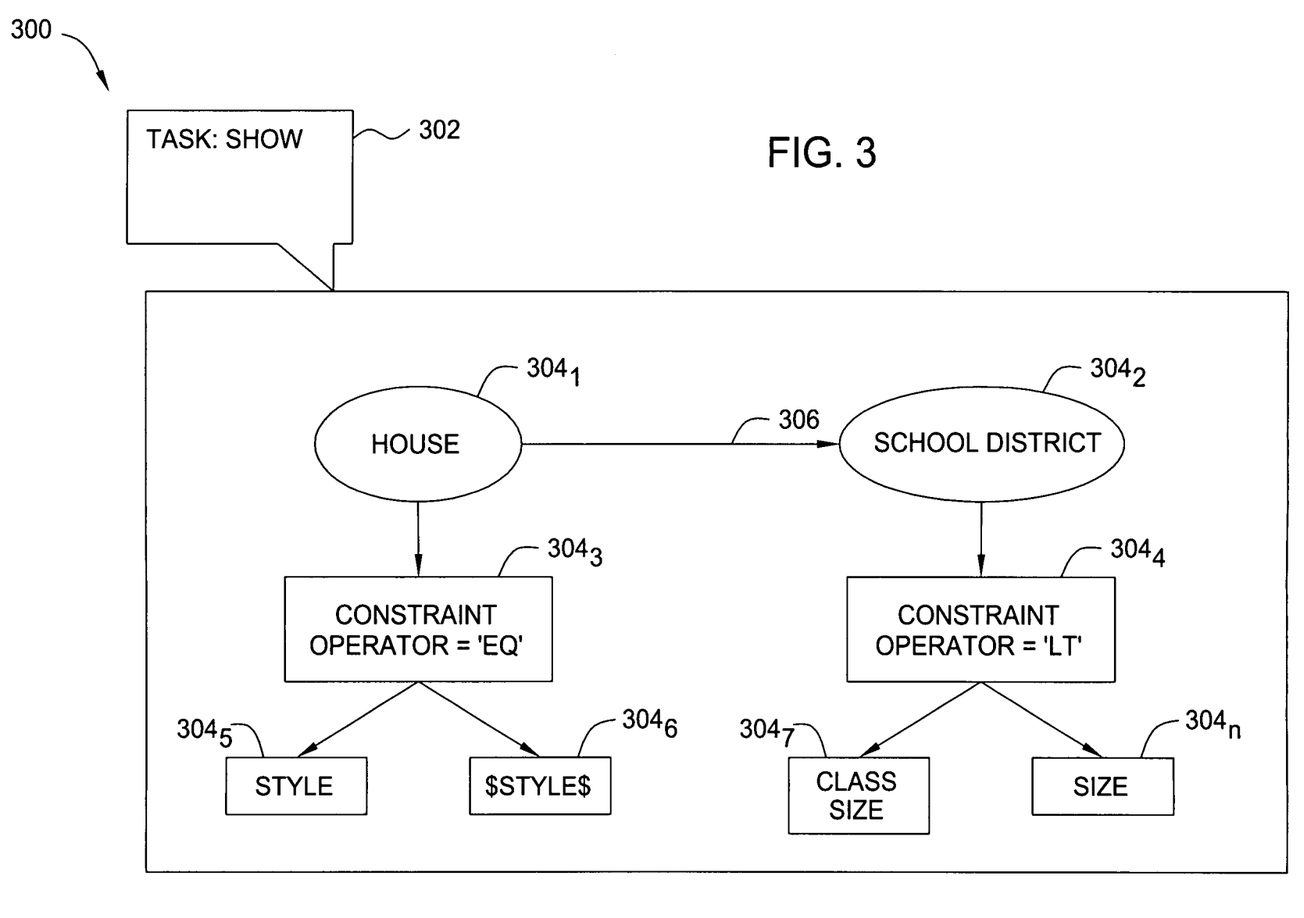
FIG. 3 is a schematic diagram illustrating one embodiment of a semantic graph derived from the interpretation results for an exemplary request template.

FIG. 3 is a schematic diagram illustrating one embodiment of a semantic graph 300 derived from the interpretation results for an exemplary request template. In one embodiment, the semantic graph 300 is a connected graph and comprises a plurality of features including at least one task 302 and a plurality of nodes $304_1$-$304_n$ (hereinafter collectively referred to as "nodes 304").

The task 302 represents the operation or action solicited in the user request (e.g., "Show x", "Find y", etc.). For example, in the exemplary user request discussed above, the associated task is "Show". The nodes 304 represent domain concepts, attributes and constraints specified in the user request. For example, the nodes $304_1$ and $304_2$ represents concepts ("House" and "School District", respectively) and the nodes $304_5$ and $304_7$ represent attributes of those concepts (the "Style" of the "House" or the "Class Size" in the "School District"). Attributes may include one or more variables (e.g., nodes $304_6$ and $304_n$) that can be instantiated using one or more of a plurality of values (e.g., a Tudor house). The nodes $304_3$ and $304_4$ represent constraints that relate the concepts to the attributes in the semantic graph 300. In one embodiment, a constraint may indicate that an attribute in the original user request is equal to ('EQ'), not equal to, greater than ('GT') and/or less than ('LT') a represented constraint. For example, the constraint represented by the node $304_3$ indicates that the "Style" is (is "equal to") a given style. The constraint represented by the node $304_4$ indicates that the "Class Size" in the "School District" is less than a given amount. Moreover, each node 304 is also associated with a set of features that further describe the properties of the nodes 304, such as meta type and form (e.g., a single instance or a list).

In one embodiment, the semantic graph 300 also includes one or more relational links 306 that indicate a relationship between two or more nodes 304. For example, the relational link 306 indicates a semantic relationship (e.g., as defined in the data ontology) between the nodes $304_1$ ("House" concept) and $304_2$ ("School District" concept).

Figure 4:
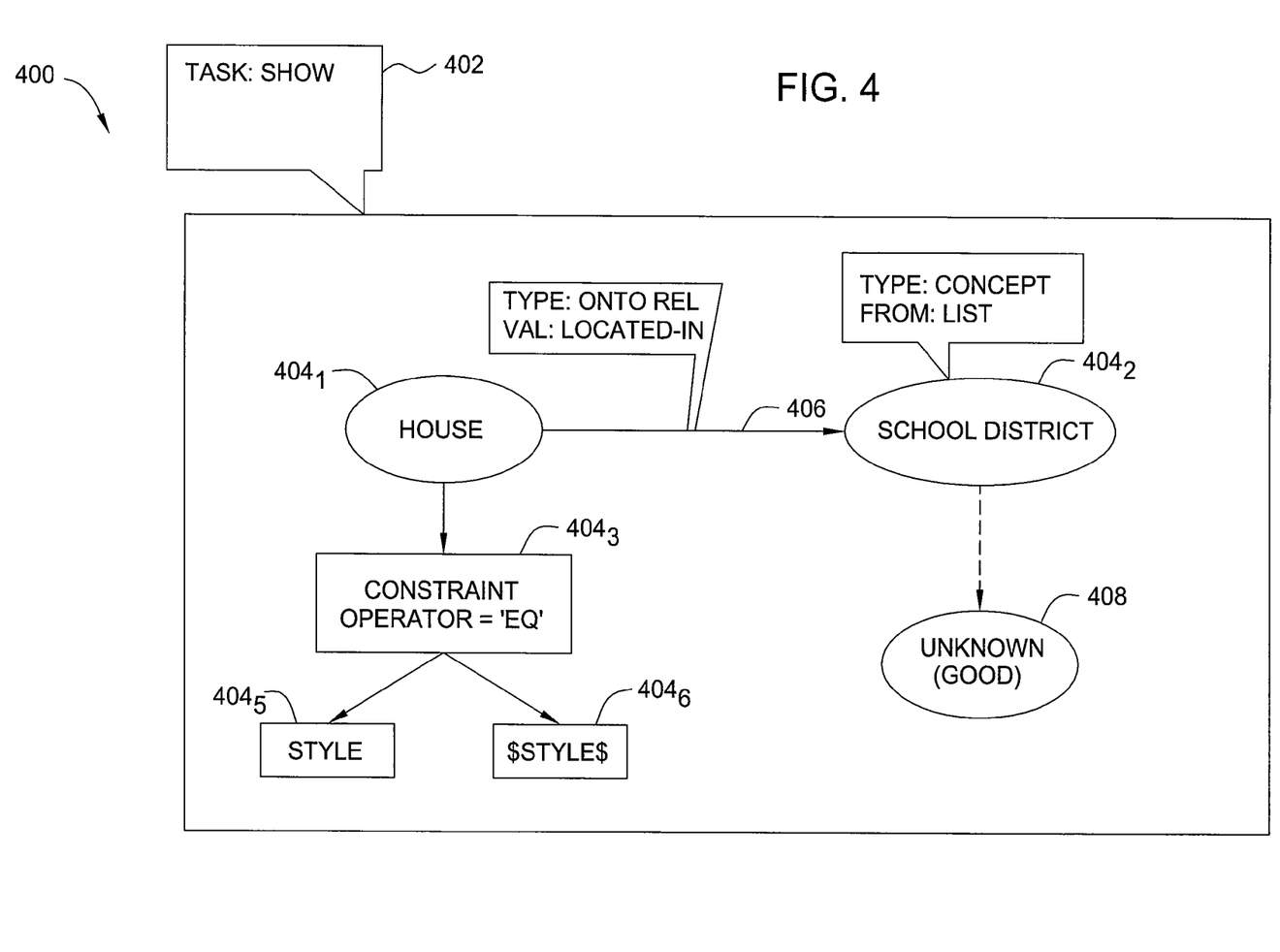
FIG. 4 is a schematic diagram illustrating a semantic graph associated with an exemplary, partially interpreted user request.

FIG. 4 is a schematic diagram illustrating a semantic graph 400 associated with an exemplary, partially interpreted user request. Those skilled in the art will appreciate that, like the stored request templates, user requests can be represented as a semantic graph since the features associated with a user request are typically the same or similar to the features associated with a stored request template, except for semantic features associated with problematic interpretations (e.g., un-interpretable terms). Thus, the semantic graph 400 representing the exemplary user request comprises at least one task 402 and a plurality of nodes $404_1$-$404_n$ (hereinafter collectively referred to as "nodes 404"), some of which may be connected by relational links 406. If the user request is at least partially un-interpretable, the semantic graph 400 will also include at least one unknown node 408 representing the constituents of the user request that can not be understood or interpreted by the conversation system (e.g., "'good' school districts"). Thus, in some embodiments, the semantic graph 400 representing the user request may be a semi-connected graph due to the partial interpretation status.

Figure 5:
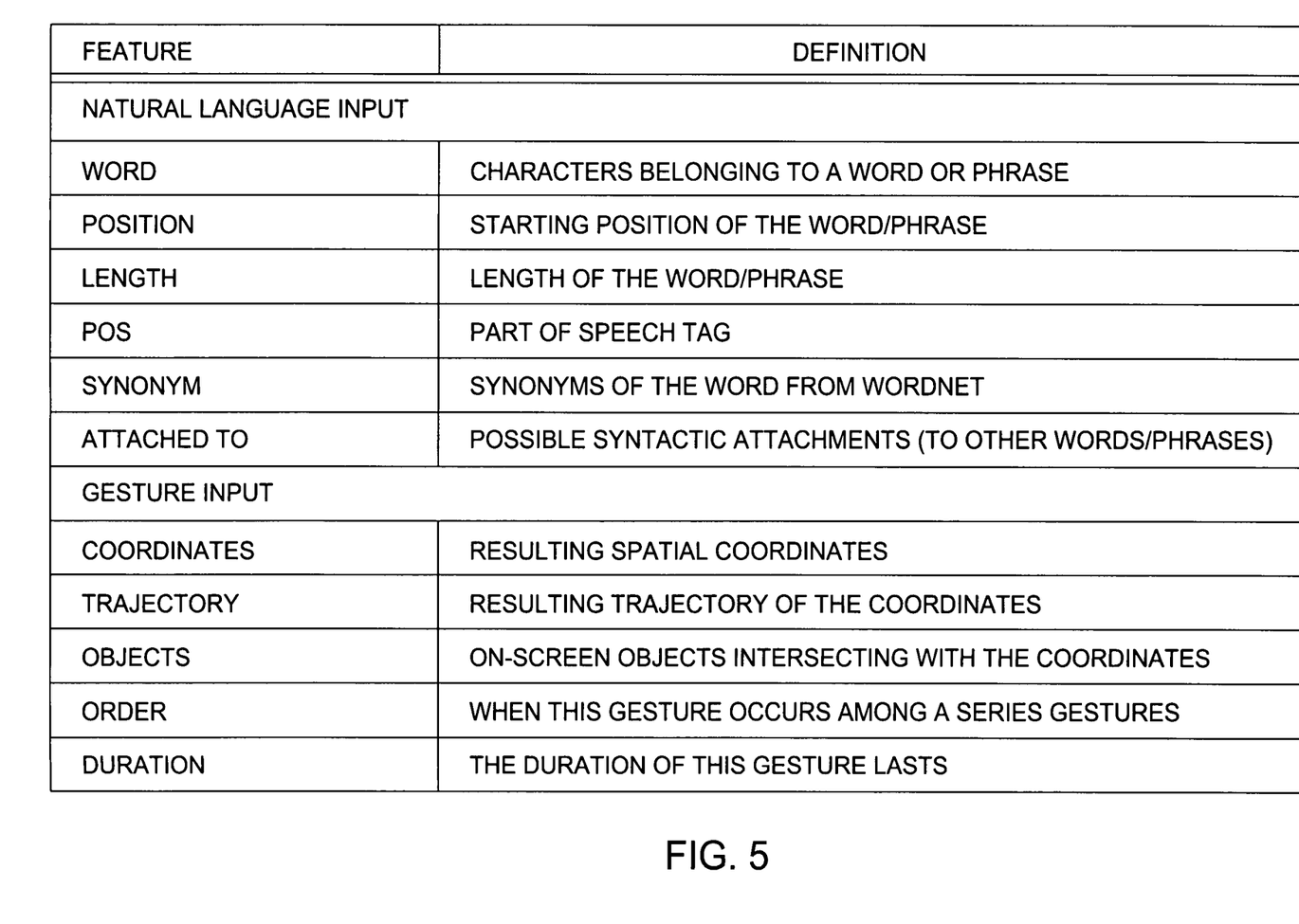
FIG. 5 is a table describing a plurality of exemplary surface features that may be associated with a stored request template or a user request.

FIG. 5 is a table describing a plurality of exemplary surface features that may be associated with a stored request template or a user request. As discussed above, a stored request template also comprises surface features (from raw input events) and contextual features (from conversation history) in addition to a semantic graph. In one embodiment, the surface features of a stored request template comprise at least one of features derived from the sequence of words in the user request (e.g., surface strings in a natural language input), features derived from gestures that are part of the user request, and feature-value pairs from graphical user interface events. For example, as illustrated in FIG. 5, surface features associated with a natural language user request may include the characters that make up a word in the user request, the position of a word in the user request and the part of speech of a word in the user request, among others. Surface features associated with a gestured user request may include the spatial coordinates of a gesture in the user request, the duration of a gesture in the user request and the order in which a gesture occurs in relation to other gestures in the user request.

In one embodiment, the contextual features of a stored request template comprise at least one of the current conversation stage, the current visual context (e.g., including objects that are shown in the current visual display as well as the objects that are in focus) and features from one or more past user requests (e.g., intention and attention types of the previous request(s)).

Figure 6:
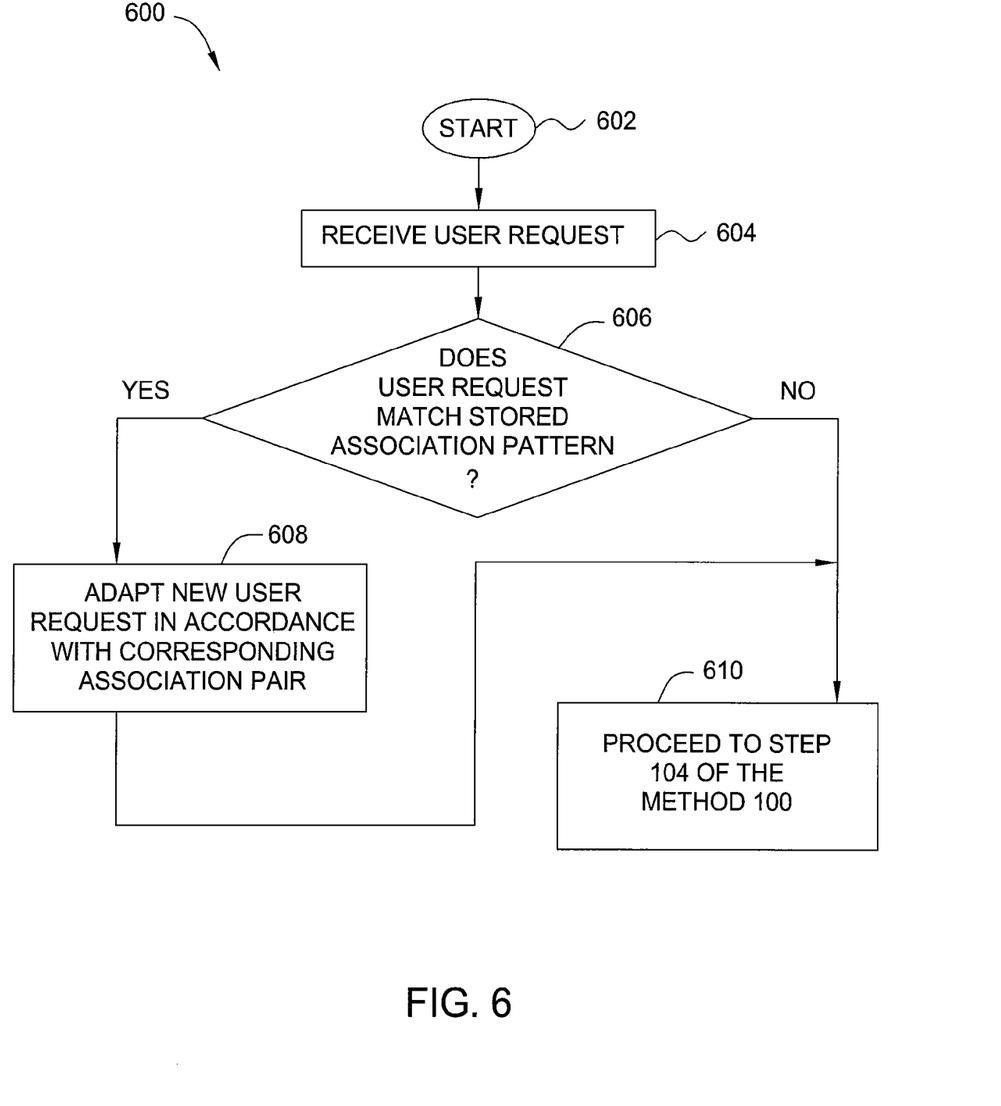
FIG. 6 is a flow diagram illustrating one embodiment of a method for learning to interpret user requests based on use over time.

FIG. 6 is a flow diagram illustrating one embodiment of a method 600 for learning to interpret user requests based on use over time. In one embodiment of the present invention, a conversation system may learn to interpret previously un-interpretable user requests based on observations of associations between previous user requests and stored template requests or modified user requests (e.g., based on adaptations using stored request templates).

The method 600 is initialized at step 602 and proceeds to step 604, where the method 600 receives a user request. The method 600 then proceeds to step 606 and determines whether the user request matches a stored association pattern (e.g., comprising an association pair).

In one embodiment, an association pattern represents an association between a previous, original user request and the valid (e.g., understandable by the conversation system) modified version of the user request. Thus, in one embodiment, an association pattern includes an association pair comprising a previous original user request and the valid modified version of the user request, as well as a confidence that indicates the strength of this association. In one embodiment, a plurality of stored association patterns is stored in an association database accessible by the method 600.

In one embodiment, matching stored association patterns are identified by abstracting the original user requests associated with each stored association pattern. To abstract an original user request, the attribute values of the original user request are replaced with variables. For example, if the original user request was, "Show Tudors in good school districts", the abstracted version would be "Show $var$ good school district", where the variable $var$ replaces the attribute "Tudor". In further embodiments, unimportant surface expressions are also removed from the original user request. Thus, the key concepts (e.g., data concepts) of the original user request are preserved, and any problems that would typically occur in trying to literally or partially match the new, un-interpretable user request to the exact stored association pattern are substantially avoided. For example, trying to match the new user request "Show all Colonials in good school districts" to the original user request "Show all Tudors in good school districts" would typically succeed after abstracting the original user request. However, trying to match the new user request "Show all Tudors in good condition" to the original user request "Show all Tudors in good school districts" would typically trigger a failure even after abstracting the original user request (e.g., since what is "good" in terms of condition may not necessarily equate to what is "good" in terms of school districts). By abstracting the original user requests before comparing stored association pairs to a new user request, these problems are substantially avoided.

Thus, if the method 600 determines in step 606 that no stored association patterns correspond to the new, un-interpretable user request, the method 600 proceeds to step 104 of the method 100 in step 610. Alternatively, if the method 600 identifies at least one stored associated pattern that matches the new, un-interpretable user request, the method 600 selects the stored association pattern with the highest confidence factor and adapts the new, un-interpretable user request in accordance with the corresponding association pair in step 608. In one embodiment, the confidence factor for the selected association pattern must meet or exceed a predefined adaptation threshold for adaptation to occur. In one embodiment, this adaptation is applied by substituting for the variables in an abstracted, original user request with attributes, constraints or features that are defined in the new user request. For example, the variable $var$ in the abstracted, original user request "Show all $var$ good school district" can be substituted with the attribute "Colonials" to produce "Show all Colonials in good school districts". Similarly, the variable $var$ in the adapted request "Show all $var$ in school districts with an average class size of 20 or less" can be substituted with the attribute "Colonials" to produce "Show all Colonials in school districts with an average class size of 20 or less". The conversation system can then process this request in accordance with any processing method.

As discussed above, association patterns for use in adapting new user requests based on past experience may be stored in an association patterns database. In one embodiment, this association database comprises both a short-term association space and a long-term association space. The short-term association space comprises association patterns learned during a current user session. The long-term space comprises association patterns learned over multiple user sessions. One motive for dividing the association database into short- and long-term space, is to better accommodate different meanings (e.g., in the minds of different users) for substantially identical user requests. For example, a "good school district" might mean a school district having class sizes of less than 20 students for one user, while a "good school district" to another user might mean a school district having at least a ninety-percent graduation rate. Thus, to tailor the adaptation of new, un-interpretable user requests to different users, a conversation system may be more likely to trust the association patterns in the short-term space that reflect the user's previously observed preferences. The long-term space, on the other hand, enables a user to benefit from the experiences of previous users.

Figure 7:
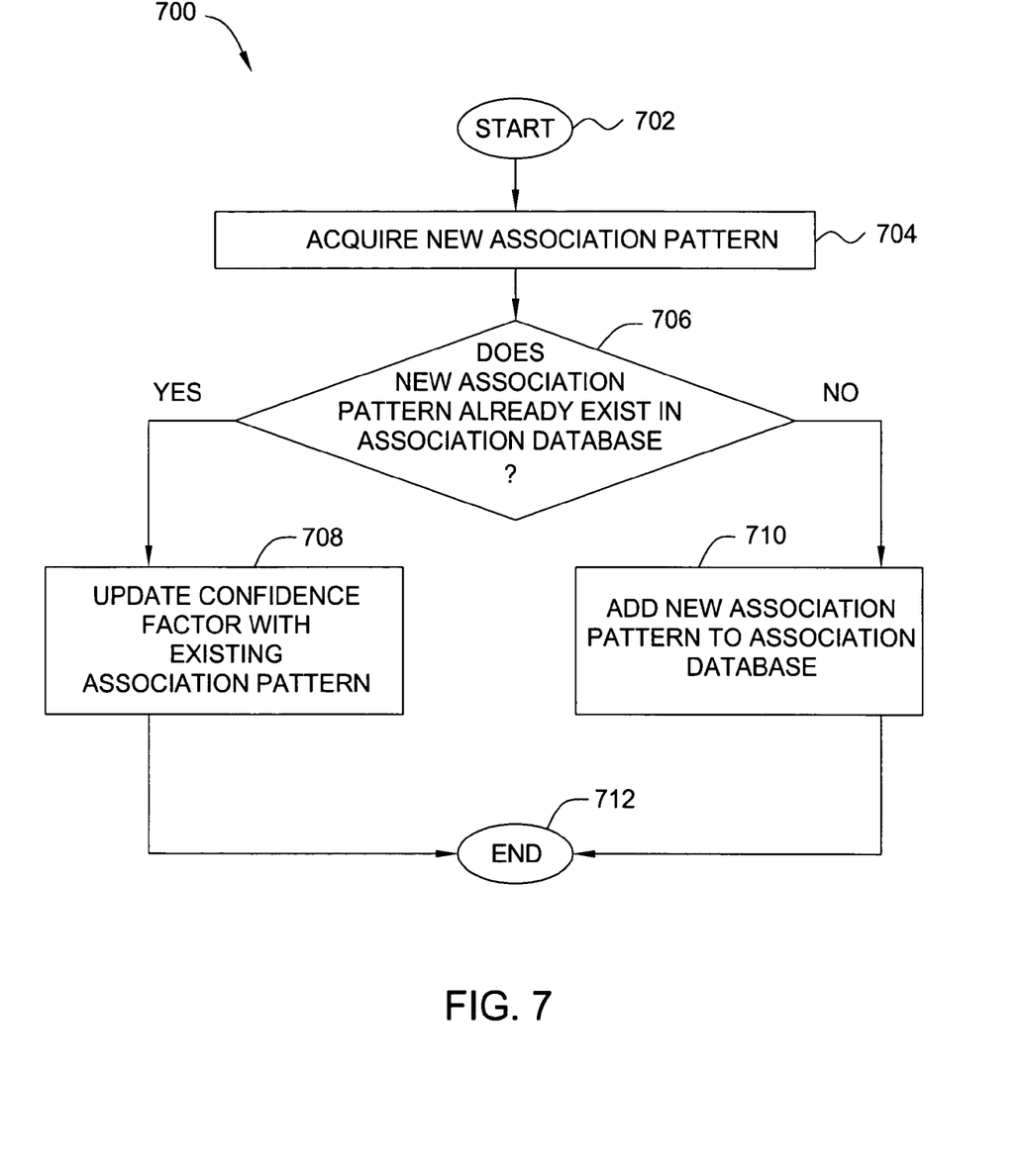
FIG. 7 is a flow diagram illustrating one embodiment of a method for updating an association database according to the present invention.

In addition, the association database may dynamically update or learn as it goes. FIG. 7 is a flow diagram illustrating one embodiment of a method 700 for updating an association database according to the present invention. The method 700 is initialized at step 702 and proceeds to step 704, where the method 700 acquires a new association pattern. The new association pattern may be obtained, for example, through application of the method 100.

The method 700 then proceeds to step 706 and determines whether the new association pattern already exists in the association database. In one embodiment, this determination is made by matching the new association pattern against every existing association pattern in both the short-term and long-term spaces, e.g., using the matching technique (based on abstract modification) discussed with reference to FIG. 6.

If the method 700 determines in step 706 that the new association pattern already exists in the association database, the method 700 proceeds to step 708 and updates the confidence factor associated with the existing association pattern. In one embodiment, the confidence factor is increased by a first amount if the existing association pattern resides in the short-term space, but is increased by a different second amount if the existing association pattern resides in the long-term space.

Alternatively, if the method 700 determines in step 706 that the new association pattern does not already exist in the association database, the method 700 proceeds to step 710 and adds the new association pattern to the association database. In one embodiment, the new association pattern is added to only the short-term space with a short-term initial confidence factor. In another embodiment, the new association pattern is also added to the long-term space with a long-term initial confidence factor. In one embodiment, the long-term initial confidence factor is smaller than the short-term initial confidence factor since reuse of the expression that generated the new association pattern in the current session is intuitively "safer". In one embodiment, the new association pattern is added to both the long-term space and short-term space with respective initial confidence factors. The method 700 then terminates in step 712.

Figure 8:
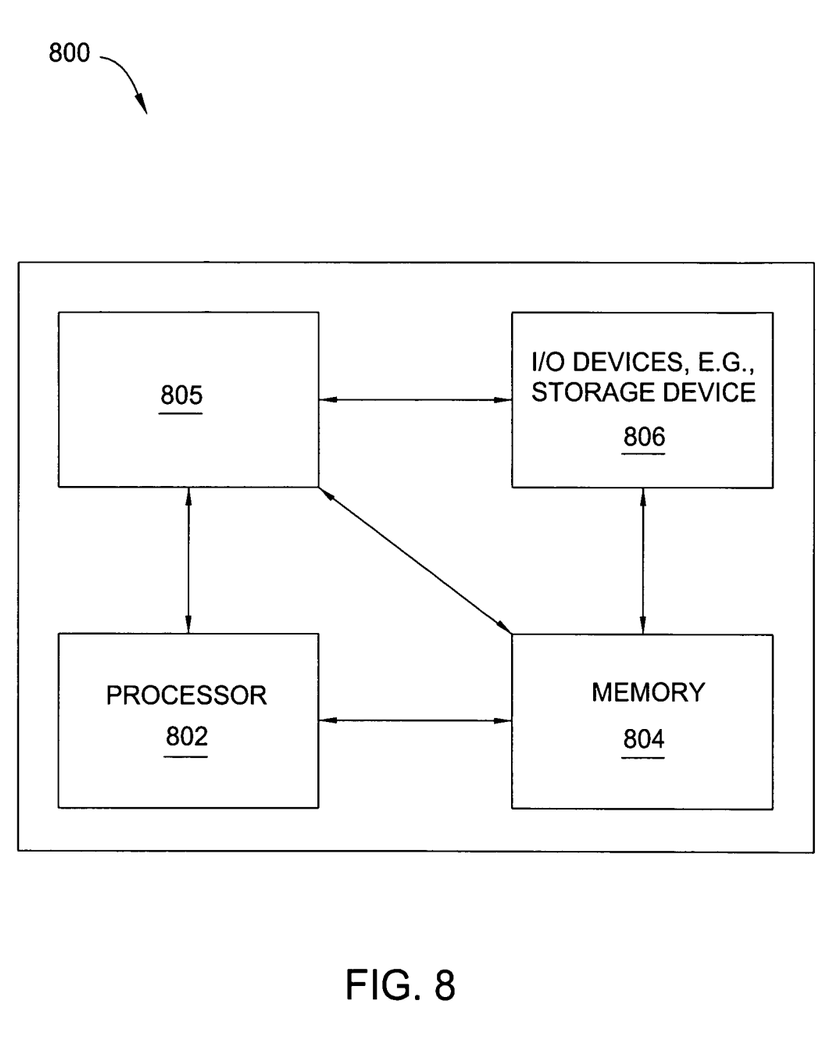
FIG. 8 is a high level block diagram of the present input interpretation method that is implemented using a general purpose computing device.

FIG. 8 is a high level block diagram of the present input interpretation method that is implemented using a general purpose computing device 800. In one embodiment, a general purpose computing device 800 comprises a processor 802, a memory 804, an input interpretation module 805 and various input/output (I/O) devices 806 such as a display, a keyboard, a mouse, a modem, a network connection and the like. In one embodiment, at least one I/O device is a storage device (e.g., a disk drive, an optical disk drive, a floppy disk drive). It should be understood that the input interpretation module 805 can be implemented as a physical device or subsystem that is coupled to a processor through a communication channel.

Alternatively, the input interpretation module 805 can be represented by one or more software applications (or even a combination of software and hardware, e.g., using Application Specific Integrated Circuits (ASIC)), where the software is loaded from a storage medium (e.g., I/O devices 806) and operated by the processor 802 in the memory 804 of the general purpose computing device 800. Additionally, the software may run in a distributed or partitioned fashion on two or more computing devices similar to the general purpose computing device 800. Thus, in one embodiment, the input interpretation module 805 for interpreting input user requests described herein with reference to the preceding figures can be stored on a computer readable medium or carrier (e.g., RAM, magnetic or optical drive or diskette, and the like).

Thus, the present invention represents a significant advancement in the field of conversation systems. Embodiments of the present invention may be implemented by both uni-modal and multi-modal conversation systems to improve interpretation capability. A two-way adaptation framework not only enables a user to adapt to the conversation system capabilities in context, but also enables the conversation system to dynamically learn new user expressions. The present invention can therefore provide results in a manner that is quicker and less failure or error prone than conventional techniques implemented in conversations systems.

While foregoing is directed to the preferred embodiment of the present invention, other and further embodiments of the invention may be devised without departing from the basic scope thereof, and the scope thereof is determined by the claims that follow.

The invention claimed is:

1. A method for interpreting a user request, the method comprising:
    receiving, by a processor, an initial user request from a user;
    interpreting, by the processor, the initial user request, where the processor fails to fully interpret the initial user request due to a presence of at least one un-interpretable expression in the initial user request wherein the interpreting comprises:
        identifying an abstracted version of a previous user request that matches the initial user request, wherein at least one attribute value in the abstracted version of the previous request has been replaced with a variable; and
        replacing the variable with an attribute defined in the initial user request to produce a modified version of the initial user request;
    and
    generating, by the processor, at least one alternative request in a context of the initial user request, the at least one alternative request being phrased in a manner that the processor can successfully interpret and that satisfies a combination of semantic constraints, syntactic constraints, and contextual constraints relating to the initial user request, wherein the generating comprises:
        retrieving a modified version of the previous user request that is stored with the abstracted version of the previous user request; and
        adapting the modified version of the initial user request in accordance with the modified version of the previous user request to produce the at least one alternative request, where the modified version of the previous user request has been fully interpreted by the processor.

2. The method of claim 1, wherein the initial user request comprises at least one of: a spoken request, a text request, a gesture or graphical user interface request.

3. The method of claim 1, further comprising:
    presenting the at least one alternative request to the user; and
    receiving a new user request, the new user request comprising one of the at least one alternative request that has been selected or selected and modified by the user.

4. The method of claim 3, further comprising:
    storing an association pattern comprising the initial user request and the new user request, wherein the association pattern is stored in an association database comprising a plurality of association patterns associated with previous interactions between a previous user and the processor, each of the previous interactions pertaining to a pair of user requests comprising one unsuccessfully interpreted user request from the previous user and one alternative request that was selected or selected and modified by the previous user.

5. The method of claim 4, wherein the association pattern further comprises a confidence score indicating a strength of an association between the initial user request and the new user request.

6. The method of claim 4, further comprising:
    using the association pattern to interpret a subsequent user request.

7. The method of claim 6, wherein the using comprises:
    abstracting the initial user request;
    matching the initial user request, after the abstracting, to the subsequent user request; and
    adapting the subsequent user request based on the association pattern.

8. The method of claim 7, wherein the abstracting comprises:
    replacing one or more attribute values in the initial user request with one or more variables.

9. The method of claim 8, wherein the adapting comprises:
    replacing the one or more variables with one or more attributes defined in the subsequent user request.

10. The method of claim 1, wherein the interpreting results in a semantic structure representing an overall interpretation status of the initial user request, the semantic structure comprising:
    at least one task specified by the initial user request; and
    a plurality of nodes labeled by domain concepts, attributes, or constraints specified by the initial user request, wherein the plurality of nodes are connected by a set of relational links,
    wherein at least one of the plurality of nodes represents the at least one un-interpretable term and is labeled as unknown, thereby rendering the semantic graph only partially connected.

11. The method of claim 1, wherein the interpreting results in a plurality of surface features derived from one or more raw input events associated with the initial user request.

12. The method of claim 1, wherein the interpreting results in a plurality of contextual features derived from a conversation history associated with the initial user request.

13. The method of claim 1, wherein the at least one un-interpretable expression is an expression that is at least one of: ambiguous, subjective, evaluative, phrased in a manner that is not understood, or pertaining to information for which no data is available.

14. The method of claim 1, wherein the semantic constraints, syntactic constraints, and contextual constraints are each applied to the initial user request in its entirety.

15. A method for interpreting a user request, the method comprising:

receiving, by a processor, an initial user request from a user;

interpreting, by the processor, the initial user request, where the processor fails to fully interpret the initial user request due to a presence of at least one un-interpretable expression in the initial user request, wherein the interpreting results in a semantic structure representing an overall interpretation status of the initial user request, the semantic structure comprising:

at least one task specified by the initial user request; and a plurality of nodes labeled by domain concepts, attributes, or constraints specified by the initial user-request, wherein the plurality of nodes are connected by a set of relational links, which represent a semantic graph, wherein at least one of the plurality of nodes represents the at least one un-interpretable term and is labeled as unknown, thereby rendering the semantic graph only partially connected;

and generating, by the processor, at least one alternative request in a context of the initial user request, the at least one alternative request being phrased in a manner that the processor can successfully interpret and that satisfies a combination of semantic constraints, syntactic constraints, and contextual constraints relating to the initial user request.

* * * * *